United States Patent
Aono et al.

(10) Patent No.: US 6,920,450 B2
(45) Date of Patent: Jul. 19, 2005

(54) RETRIEVING, DETECTING AND IDENTIFYING MAJOR AND OUTLIER CLUSTERS IN A VERY LARGE DATABASE

(75) Inventors: Masaki Aono, Yokohama (JP); Mei Kobayashi, Yokohama (JP); Hikaru Samukawa, Tokyo (JP); Hironori Takeuchi, Yokohama (JP)

(73) Assignee: International Business Machines Corp, Armonk, NY (US)

( * ) Notice: Subject to any disclaimer, the term of this patent is extended or adjusted under 35 U.S.C. 154(b) by 476 days.

(21) Appl. No.: 10/190,990

(22) Filed: Jul. 8, 2002

(65) Prior Publication Data
US 2004/0010485 A1 Jan. 15, 2004

(51) Int. Cl.[7] ............................................. G06F 17/30
(52) U.S. Cl. ........................... 707/3; 707/1; 707/4; 707/5
(58) Field of Search ........................... 707/1–5, 6, 100, 707/101, 200

(56) References Cited

U.S. PATENT DOCUMENTS 5,619,709 A * 4/1997 Caid et al. .................. 715/532

2003/0217047 A1 * 11/2003 Marchisio ..................... 707/3

* cited by examiner

Primary Examiner—Alford W. Kindred
(74) Attorney, Agent, or Firm—Marc D. McSwain

(57) ABSTRACT

The present invention discloses a method, a computer system, a computer readable medium and a sever. The method of the present invention comprises steps of; creating said document matrix from said documents using at least one attribute; creating a scaled residual matrix based on said document matrix using a predetermined function; executing singular value decomposition to obtain a basis vector corresponding to the largest singular value; re-constructing said residual matrix and scaling dynamically said re-constructed residual matrix to obtain another basis vector; repeating said singular value decomposition step to said re-constructing step to create a predetermined set of basis vector; and executing reduction of said document matrix to perform detection, retrieval and identification of said documents in said database.

23 Claims, 14 Drawing Sheets

Fig. 1

"Singular Value Decomposition"

Theorem: Any M by N matrix A (where $M \geq N \geq rank(A)$) can be decomposed into product of two orthoronal matrices and one diagonal matrix as follows:

$$A = U S V^T,$$

Representative Method for the Singular Value Decomposition (1) U: M by M square orthogonal matrix, and first Q rows thereof are eigenvectors of $AA^T$.

V: N by N square orthogonal matrix, and first Q rows thereof are eigenvectors of $A^TA$.

S: M by N diagonal matrix and its singular values are the positive square roots of the non-zero eigenvalues of $AA^T$ and $A^TA$.

(2) U: M by Q orthogonal matrix, and each row thereof is an eigenvector of $AA^T$.

V: N by Q orthogonal matrix, and each row thereof is an eigenvector of $A^TA$.

S: Q by Q square diagonal matrix and its Q singular values are the positive square roots of the non-zero eigenvalues of $AA^T$ and $A^TA$.

(3) U: M by N square orthogonal matrix, and first Q rows thereof are eigenvectors of $AA^T$.

V: N by N square orthogonal matrix, and first Q rows thereof are eigenvectors of $A^TA$.

S: N by N diagonal matrix and its Q is singular values are the positive square roots of the non-zero eigenvalues of $AA^T$ and $A^TA$.

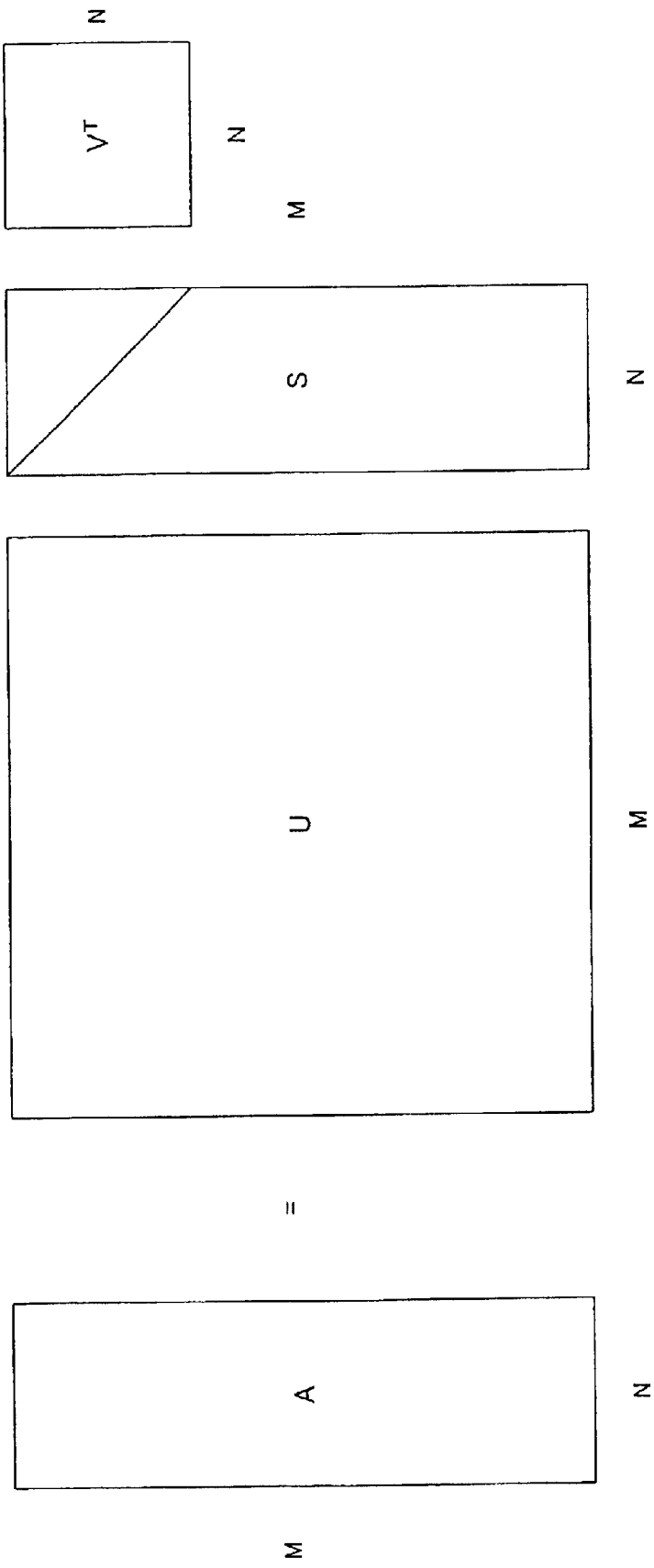
Fig. 2 A schematic diagram of the singular value decomposition according to (1)

A schematic diagram of the singular value decomposition according to (3)

Fig. 6

$$\mathbf{R} = \mathbf{A};$$

for (i=1; i ≤ k; i++){

$$\mathbf{R}_s = [|\mathbf{r}_1|^q \mathbf{r}_1, ..., |\mathbf{r}_M|^q \mathbf{r}_M]^T;$$

$\mathbf{b}_i$ = the first eigenvector of $\mathbf{R}_s^T \mathbf{R}_s$;

$\mathbf{R} = \mathbf{R} - \mathbf{R}\mathbf{b}_i\mathbf{b}_i^T,$ // residual matrix

$$\mathbf{R} = \mathbf{A};$$

for (i=1; i ≤ k; i++){

$$t_{max} = \max(|\mathbf{r}_1|, ..., |\mathbf{r}_M|);$$

$$q = \text{func}(t_{max});$$

$$\mathbf{R}_s = \left[|\mathbf{r}_1|^q \mathbf{r}_1, ..., |\mathbf{r}_M|^q \mathbf{r}_M\right]^T;$$

SVD $(\mathbf{R}_s)$;   //  $\mathbf{R}_s = \mathbf{USV}^T$ $\mathbf{b}_i' = $ the first row vector of $\mathbf{V}^T$;

$\mathbf{b}_i = \text{MGS}(\mathbf{b}_i');$   // modified Gram-Schmidt $\mathbf{R} = \mathbf{R} - \mathbf{R}\mathbf{b}_i\mathbf{b}_i^T;$   // residual matrix

}

Fig. 11
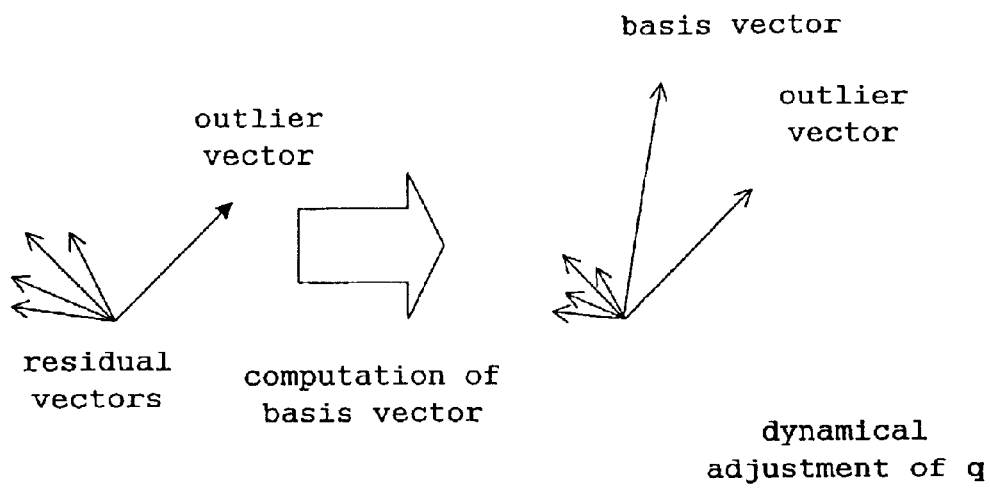
(a)
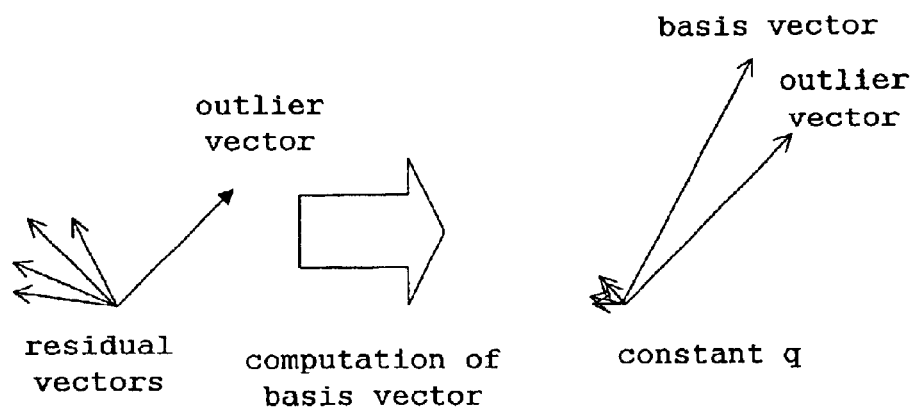
(b)

Fig. 12

$$\mathbf{R} = \mathbf{A};$$

for (i=1; i ≤ k; i++){

$$t_{max} = \max(|\mathbf{r}_1|, ..., |\mathbf{r}_M|);$$

$$q = \text{func}(t_{max});$$

$$\mathbf{R}_s = \left[|\mathbf{r}_1|^q \, \mathbf{r}_1, ..., |\mathbf{r}_M|^q \, \mathbf{r}_M\right]^T;$$

$$\mathbf{C} = \text{COV}(\mathbf{R}_s);$$

$$\text{SVD}(\mathbf{C}); \quad // \quad \mathbf{C} = \mathbf{VSV}^T$$

$$\mathbf{b}_i' = \text{the first row vector of } \mathbf{V}^T;$$

$$\mathbf{b}_i = \text{MGS}(\mathbf{b}_i'); \quad // \text{ modified Gram-Schmidt}$$

$$\mathbf{R} = \mathbf{R} - \mathbf{R}\,\mathbf{b}_i\,\mathbf{b}_i^T, \quad // \text{ residual matrix}$$

Test Data (Keyword)

| 1 CLINTON | 2 ALGORE | 3 HILLARY | 4 CHELSEA | 5 BUSH | 6 JAPAN | 7 JAVA | 8 APPLET | 9 JSP | 10 APACHE |
|---|---|---|---|---|---|---|---|---|---|
| 11 health | 12 Bluetooth | 13 soccer | 14 matrix | 15 DNA | 16 heat | 17 music | 18 dream | 19 center | 20 whisper |
| 21 cat | 22 spring | 23 power | 24 god | 25 shark | 26 stock | 27 insect | 28 silk | 29 magnet | 30 snail |
| 31 latitude | 32 saga | 33 lecture | 34 pavilion | 35 museum | 36 pattern | 37 gourmet | 38 montage | 39 torch | 40 flag |

RETRIEVING, DETECTING AND IDENTIFYING MAJOR AND OUTLIER CLUSTERS IN A VERY LARGE DATABASE

FIELD OF THE INVENTION

The present invention relates to computation of large matrices, and particularly relates to a method, a computer system, a computer readable medium, and a server which may effectively retrieve, detect and identify major and outlier clusters in a very large database.

BACKGROUND OF THE ART

A recent database system becomes to handle increasingly a large amount of data such as, for example, news data, client information, stock data, etc.. Use of such databases become increasingly difficult to search desired information quickly and effectively with sufficient accuracy. Therefore, timely, accurate, and inexpensive detection of new topics and/or events from large databases may provide very valuable information for many types of businesses including, for example, stock control, future and options trading, news agencies which may afford to quickly dispatch a reporter without affording a number of reporters posted worldwide, and businesses based on the Internet or other fast paced actions which need to know major and new information about competitors in order to succeed thereof.

Conventionally, retrieval, detection and identification of documents in enormous database is expensive, elaborate, and time consuming work, because mostly a searcher of the database needs to hire extra persons for monitoring thereof.

Recent retrieval, detection and identification methods used for search engines mostly use a vector space model for data in the database in order to cluster the data. These conventional methods generally construct a vector f (kwd1, kwd2, . . . , kwdn) corresponding to the data in the database. The vector f is defined as the vector having the dimension equal to numbers of attributes, such as kwd1, kwd2, . . . , kwdn which are attributed to the data. The most commonly used attributes are keywords, i.e., single keywords, phrases, names of person (s), place (s), and time/date stamp. Usually, a binary vector space model is used to create the vector f mathematically in which the kwd1 is replaced to 0 when the data does not include the kwd1, and the kwd1 is replaced to 1 when the data include the kwd1. Sometimes, a weight factor is combined to the binary model to improve the accuracy of the search. Such a weight factor includes, for example, appearance times of the keywords in the data.

DISCLOSURE OF THE PRIOR ARTS

U.S. Pat. No. 4,839,853 issued to Deerwester et al., entitled "Computer information retrieval using latent semantic structure", and Deerwester et. al., "Indexing by latent semantic analysis", Journal of the American Society for Information Science, Vol. 41, No. 6, 1990, pp. 391–407 discloses a unique method for retrieving the document from the database. The disclosed procedure is roughly reviewed as follows;

Step 1: Vector Space Modeling of Documents and Their Attributes

In the latent semantic indexing (hereinafter defined as LSI), the documents are modeled by vectors in the same way as in Salton's vector space model and reference: Salton, G. (ed.), The Smart Retrieval System, Prentice-Hall, Englewood Cliffs, N.J., 1971. In the LSI method, the documents in the database are represented by an m-by-n matrix MN, the entries are represented by mn (i, j), i.e., $$MN=[mn(i,j)].$$

In other words, the rows of the matrix MN are vectors which represent each document in the database. The query is also modeled by a vector which exists in the same attribute space as the documents in the database.

Step 2: Reducing the Dimension of the Ranking Problem via the Singular Value Decomposition The next step of the LSI method executes the singular value decomposition, or SVD of the matrix MN. Noises in the matrix MN are reduced by constructing a modified matrix from the k-th largest singular values $\sigma_i$, wherein i=1, 2, 3, . . . , k, . . . , N and their corresponding eigenvectors are derived from the following relation;

$$MN_k=U_k S_k V_k^T,$$

wherein $S_k$ is a diagonal matrix with k monotonically decreasing non-zero diagonal elements of $\sigma_1, \sigma_2, \sigma_3, \ldots, \sigma_k$. The matrices $U_k$ and $V_k$ are the matrices whose columns are the left and right singular vectors of the k-th largest singular values of the matrix MN.

Step 3: Query Processing

Processing of the query in LSI-based Information Retrieval comprises further two steps (1) query projection followed by (2) matching. In the query projection step, input queries which have been modeled as vectors are mapped to pseudo-documents in the reduced document-attribute space by the matrix $U_k$, and then are weighted by the corresponding singular values $\sigma_i$ from the reduced rank and singular matrix LSI of Deerwester et. al. realized retrieval and identification of documents which have similar keywords (i.e., keywords which are synonyms) such as "moon" and "lunar" that are not retrieved together in the conventional vector space model while providing real time retrieval of the documents and acceptable computation time with respect to a query based on analysis of meanings of the keywords. LSI of Deerwester et al. also resolves the polysemy problem, i.e., LSI distinguishes keywords which have the same spelling but different meaning and uses this information to improve the accuracy of retrieval. Their technical idea utilizes linear algebra, especially a Singular Value Decomposition (SVD) for a rectangular matrix of any given size. The SVD theorem is summarized in FIG. 1 and the three methods for SVD are schematically described in FIG. 2 to FIG. 4.

The above described SVD theorem has useful property that SVD is performed even when a matrix A is square. Particularly, when a matrix A is a real, symmetric, positive semi-definite matrix, the matrix A can be transformed as follows:

$$A=USV^T,$$

wherein S is a diagonal matrix of which diagonal elements are singular values and the superscript "T" denotes a transpose of the corresponding matrix. Another important property of the SVD is the matrices U and V described in FIGS. 2–4 are orthogonal matrices so that the Euclidean norm of any vectors x and y of appropriate dimension may be retained, i.e., $|x|_2=|Ux|_2$ and $|y|_2=|Vy|_2$. The essential key of SVD is the diagonal matrix represented by S as described in FIGS. 2–4. The diagonal matrix S includes its diagonal elements of real numbers which are singular values and the singular values may be aligned in the descending order from the largest one.

Using the property described above, the reduction of the dimension of the document matrix is performed so that predetermined numbers k (usually k<<rank Q) of the singular values in the descending order from the largest value are selected so as to represent the matrix A to create the diagonal matrix. This dimensional reduction method generally provides sufficient results for documents corresponding to the large singular values and associated eigenvector corresponding thereto (Michael W. Berry, Susan T. Dumais, and Gavin W. O'Brien, "Using Linear Algebra for Intelligent Information Retrieval", SIAM Review Vol. 37, No. 4, pp. 573–595, 1995).

Kobayashi et al. have proposed and filed another effective method to reduce the dimension of the document matrix using a covariance matrix, which hereinafter is defined as COV. The method is briefly described as follows:

Step 1: A document matrix is formed from the documents as describe above. Then a covariance matrix for a given M x N document matrix is computed by the following formula:

$$K = \frac{1}{M} \sum_{i=1}^{M} d_i d_i^T - (^{bar}d)(^{bar}d^T),$$

wherein K represents a covariance matrix, $d_i$, $^{bar}d$ and $^{bar}d_i$ are defined using elements of the document matrix $a_{i,j}$ as follows:

$$d_i = \begin{bmatrix} a_{i,1} \\ \vdots \\ a_{i,N} \end{bmatrix}, \quad ^{bar}d = \begin{bmatrix} ^{bar}d_1 \\ \vdots \\ ^{bar}d_N \end{bmatrix}, \quad ^{bar}d_i = \frac{1}{M} \sum_{j=1}^{M} a_{j,i}$$

Step 2: Next in the COV process, singular vectors of the covariance matrix are calculated. In the computation of the singular values of the covariance matrix, well known methods in the art such as a Householder method, a Lanczos method, or a neural network method, may be used.

Step 3: Further next, the COV process reduces the dimension of the covariance matrix using predetermined numbers of singular vectors included in said matrix V such that the largest k singular vectors should be included when the desired reduced dimension is k. Then the dimension of the M×N document matrix is reduced using the dimension reduced covariance matrix to execute retrieval, detection and identification of the documents stored in the database.

The above described methods, while COV provides the improved result with respect to LSI by providing other application of the retrieved results, are together effective to retrieving and detecting the documents in the database. However, both methods include the process of the dimension reduction of the document matrix as described above, thereby causing essential inconvenience in the retrieval, detection and identification of the documents in the large database.

FIG. 5 shows a general construction of the document space derived from the database. The document space is generally categorized into a significant (major) cluster, a medium cluster, an outlier cluster, no matching cluster with respect to presence of the keywords in the documents. The term "major cluster" used herein means a cluster of documents which is comprised of more than 4% of the total documents in the database. The term "outlier cluster" used herein means a cluster of documents which is comprised of 3% to 4% of the total documents in the database. The term "medium cluster" used herein means a cluster of documents which is comprised of more documents than those in outlier clusters, but fewer documents than those in major clusters. When the dimension reduction is performed to the document matrix, usually several eigenvectors or singular vectors from the largest top singular values or eigenvalues are taken into account to create the document matrix of reduced dimension in order to improve efficiency and accuracy of the cluster retrieval, detection and identification.

Therefore, in most cases, the outlier cluster tends to be discarded from the matrix of reduced dimension and such documents in the outlier clusters may not be retrieved, detected and identified. It is, of course preferred, depending on kinds of databases, that such outlier clusters are effectively discarded in the retrieval of the documents, however, the documents in the outlier cluster should not be discarded in the retrieval of the documents in a particular database, such as, for example, a database including information for inquiries of new products, or documents increasingly accumulated in the database with respect to time elapse after a certain event has happened such as the release of new products or a large earthquake occurred in elsewhere in the world. It is desired, in the retrieval of the document included in such databases, that the outlier clusters are not discarded in the dimension reduction process.

There have been several attempts to retain the outlier clusters in the dimension reduction process of the document matrix A. Ando has disclosed, in "Latent Semantic Space: iterative scaling improves precision of inter-document similarity measurement", Proc. SIGIR 2000, pp. 216–223, a method for saving the outlier cluster from being discarded when the dimension of the document space was reduced. Ando's algorithm is described in a pseudo-code in FIG. 6.

As described in FIG. 6, the process Ando disclosed first defines a residual matrix R as a M by N matrix. Next the process scales the residual matrix R by multiplying a power of q to norms of the residual vector $|r_i|$ of the residual vector $r_i$ to create a scaled residual matrix $R_s$ and then computes an eigenvector $b_i$ of a product of matrices $R_s^T R_s$. The eigenvector $b_i$ may be then selected as basis vectors for dimensional reduction. Further next, the process of Ando re-constructs the matrix R with the computed eigenvalue $b_i$.

After the procedure described above, the document vector $d_i$ originally in N-dimension is approximated by $^{hat}d_i$ in the reduced k-dimension using k-basis vectors obtained by the process described in FIG. 6 as follows:

$$^{hat}d_i = [b_1, \ldots, b_k]^T d_i$$

It is noted that Ando's method described in the pseudo code in FIG. 6 uses constant scaling factors and a power of the scaling factors of the norm $|r_i|$ are each multiplied to the corresponding residual vector $r_i$. Although Ando's method succeeds in finding the largest outlier cluster, scaling by Ando's method often causes severe problems when the scaling factor q is larger than numeral 1; when q>1, the element of the residual matrix smaller than 1 becomes smaller and smaller, and the element of the residual matrix larger than 1 becomes larger and larger as the iteration cycle for determination of the basis vectors proceeds.

Ando's method creates another problem that minor outlier clusters are discarded in the dimension reduction process. We found experimentally that Ando's method further caused a severe problem that vectors with norms originally smaller than 1 become degenerated to disappear within the numerical computational limit and the computation of STEP 2 in FIG. 6 could not be executed.

In addition, the conventional method consumes significantly large memory resources and requires extra high CPU performance and sometimes transforms the residual matrix into a matrix such that the eigenvalue computation cannot be performed by the loop for obtaining the residual matrix. In addition to the above problem, it is predicted that the eigenvalue computation of the very large database such as, for example, including 10 million real documents and several tens of thousands of keywords, by the conventional method becomes substantially impossible using a general purpose computer.

Therefore, it is needed a method, a computer system, a program and a server for retrieving, detecting, and identifying documents in a very large database without discarding the major, medium and outlier clusters.

It is also needed a method, a computer system, a program and a server for retrieving, detecting and identifying documents in a very large database without causing a computational problem in any given document matrix.

It is further needed a method, a computer system, a program and a server for retrieving, detecting and identifying documents in a very large database which is sensitive to the outlier cluster or clusters rather than sub-clusters included in the significant (major) clusters.

It is still further needed a method, a computer system, a program, and a server which may successfully perform the retrieval, identification and detection of the documents included in the very large database within an acceptable computation time and computer hardware resources.

SUMMARY OF THE INVENTION

The present invention has been made with the recognition that the parameter q should be determined by considering the norm of the residual vector so that the iteration cycle of the SVD process does not cause degeneration of the residual vectors.

The process of the present invention first creates a document matrix A in a M×N form from a very large database including documents according to the vector space model. In the iteration of the SVD, an initial R matrix is selected as the document-keyword matrix A. The created R residual matrix is conveniently represented by the following formula:

$$R = [r_1, \ldots, r_M]^T,$$

wherein $r_i$ is defined hereinafter as a top i-th residual vector and T denotes a transpose thereof.

In the present invention, the residual matrix is further scaled by a scaling function "func" such that the scaling is formulated as follows:

$$R_s = [|r_1|^q r_1, \ldots, |r_M|^q r_M]^T.$$

Next the SVD of the scaled residual matrix $R_s$ is computed to obtain the largest singular vector $b_1$. Next a residual matrix R is re-constructed according to the following formula:

$$R = R - R b_i b_i^T$$

Since the re-constructed residual matrix R does not have the previous largest singular vector derived from the document matrix A, the largest singular vector of the next residual matrix R changes its direction so that it points more towards the outlier clusters, thereby improving the retrieval, detection and identification of the outlier clusters. The term "outlier cluster" used herein is defined as the cluster consisting of the document matrix in low ratio such as a few percent, i.e., 1–5%, more precisely about 3%–4% with respect to keywords. In addition, the scaling function "func" depends on the largest norm of the residual vectors and is adjusted so that the scaling function does not cause the degeneration of the outlier clusters. Then the top i singular vectors are derived without causing severe errors in computation and are closer to the document vectors of the outlier clusters, thereby co-operatively improving the retrieval, detection and identification of the outlier clusters.

According to the first aspect of the present invention, a method for retrieving, detecting, and identifying documents in a database, the documents in the database being constructed as a document matrix from attributes included in the documents is provided. The method comprises steps of;

creating the document matrix from the documents using at least one attribute;

creating a scaled residual matrix based on the document matrix from a predetermined function;

executing the singular value decomposition to obtain a basis vector corresponding to the largest singular value;

re-constructing the residual matrix and scaling dynamically the re-constructed residual matrix to obtain another basis vector;

repeating the singular value decomposition step after the re-constructing step to create a predetermined set of basis vectors; and executing dimension reduction of the document matrix to perform retrieval, detection and identification of the documents in the database.

In the present method, the scaled residual matrix is created according to the following equation:

$$R_s = [|r_1|^q r_1, \ldots, |r_M|^q r_M]^T$$

wherein $R_s$ is the scaled residual matrix, $r_i$ is a residual vector, i is a whole number mot more than a document munber M, $|r_i|$ is a norm of the residual vector, and q is a scaling factor dynamically determined according to the predetermined function.

In the present method, the singular value decomposition is selected by a user, the choice being between a latent semantic indexing method and a covariance matrix method. The predetermined function is a function of the largest norm of the residual vector provided by following equation:

$$q = func(t_{max}) \triangleq \begin{cases} \text{if } (t_{max} > 1) \text{ then } \dfrac{1}{t_{max}} \\ \text{if } (t_{max} \approx 1) \text{ then } P + t_{max}, \\ \text{if } (t_{max} < 1) \text{ then } \dfrac{1}{10^{2-t_{max}}} \end{cases}$$

wherein p is a whole number, $t_{max}$ is the largest norm of the residual vectors.

The above method is further comprised of a step for orthogonalizng the basis vector prior to the step for re-constructing the residual matrix. In the present method, the scaling step uses a different scaling factor for each step for obtaining the basis vector. The above method may be effectively compute the document matrix which comprises a plurality of clusters with respect to the attributes and the clusters is at least categorized into a major cluster and a outlier cluster. In the present method, the document matrix may comprise a plurality of clusters with respect to the attributes and the clusters is at least categorized into a major cluster, a medium cluster and an outlier cluster.

In a second aspect of the present invention, a computer system for retrieving, detecting and identifying documents in a database, the documents in the database being constructed as a document matrix from attributes included in the documents is provided. The computer system comprises;

means for creating the document matrix from the documents using at least one attribute;

means for scaling the residual matrix based on the document matrix from a predetermined function;

means for executing singular value decomposition to obtain a basis vector corresponding to the largest singular value;

means for re-constructing the residual matrix and scaling dynamically the re-constructed residual matrix to obtain another basis vector;

means for repeating the singular value decomposition step to the re-constructing step to create a predetermined set of basis vectors; and means for executing dimension reduction of the document matrix to perform retrieval, detection and identification of the documents in the database.

In a third aspect of the present invention, a computer readable medium storing a computer program for retrieving, detecting, and identifying documents in a database, the documents in the database being constructed as a document matrix from attributes included in the documents may be provided. The program executes steps of;

creating the document matrix from the documents using at least one attribute;

creating a scaled residual matrix based on the document matrix from a predetermined function;

executing singular value decomposition to obtain a basis vector corresponding to the largest singular value;

re-constructing the residual matrix and scaling dynamically the re-constructed residual matrix to obtain another basis vectors;

repeating the singular value decomposition step to the re-constructing step to create a predetermined set of basis vector; and executing dimension reduction of the document matrix to perform retrieval, detection and identification of the documents in the database.

In a fourth aspect of the present invention, a server for retrieving, detecting, and identifying documents in a database, the documents in the database being constructed as a document matrix from attributes included in the documents, the server communicating to a client through a network may be provided. The server comprising;

means for receiving a request for retrieving and detecting the document though the network;

means for receiving another request for selecting a method for singular value decomposition from the client;

means for creating the document matrix from the documents using at least one attribute;

means for scaling the residual matrix based on the document matrix from a predetermined function;

means for executing singular value decomposition to obtain a basis vector corresponding to the largest singular value in response to the another request;

means for re-constructing the residual matrix and scaling dynamically the re-constructed residual matrix to obtain another basis vector;

means for repeating the singular decomposition step to the re-constructing step to create a predetermined set of basis vectors; and means for executing dimension reduction of the document matrix to perform retrieval, detection and identification of the documents in the database.

means for returning at least one result of the retrieval, detection and identification to the client.

The present invention will be understood through the detailed explanation of the present invention accompanied by drawings of best modes.

BRIEF DESCRIPTION OF THE DRAWINGS

FIG. 1 shows a summary and outline of the SVD.

FIG. 2 shows a representative method for SVD.

FIG. 6 shows a pseudo-code for a conventional scaling of the residual vectors.

FIG. 10 shows a detailed pseudo-code of the Steps S4–S10 described in FIG. 9 where a user selects the process of LSI for SVD.

FIG. 11 shows a graphical representation of the function for a variable scaling factor q according to the present invention.

FIG. 12 shows a pseudo-code for an alternative embodiment which uses COV for executing the SVD.

FIG. 13 shows keywords used in examples of the present invention.

BEST MODE FOR CARRYING OUT THE INVENTION

Figure 3:
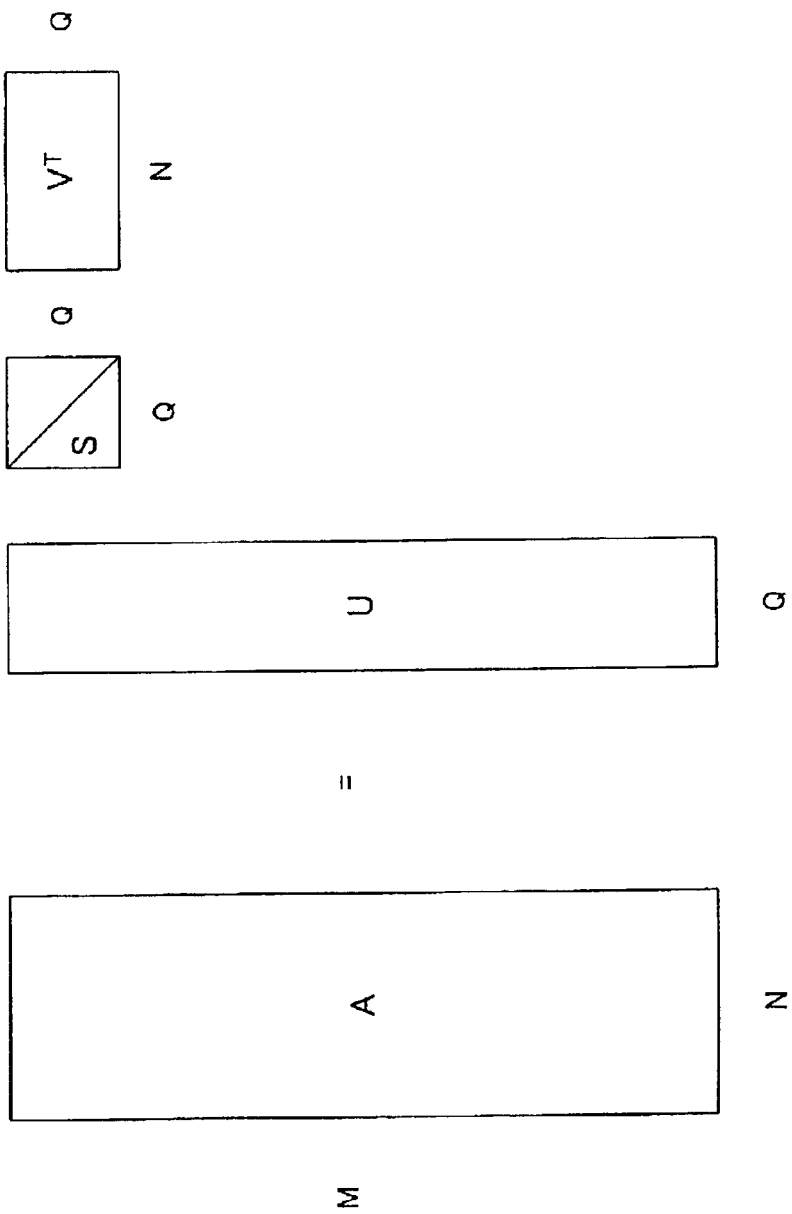
FIG. 3 shows another representative method for SVD.
Figure 4:
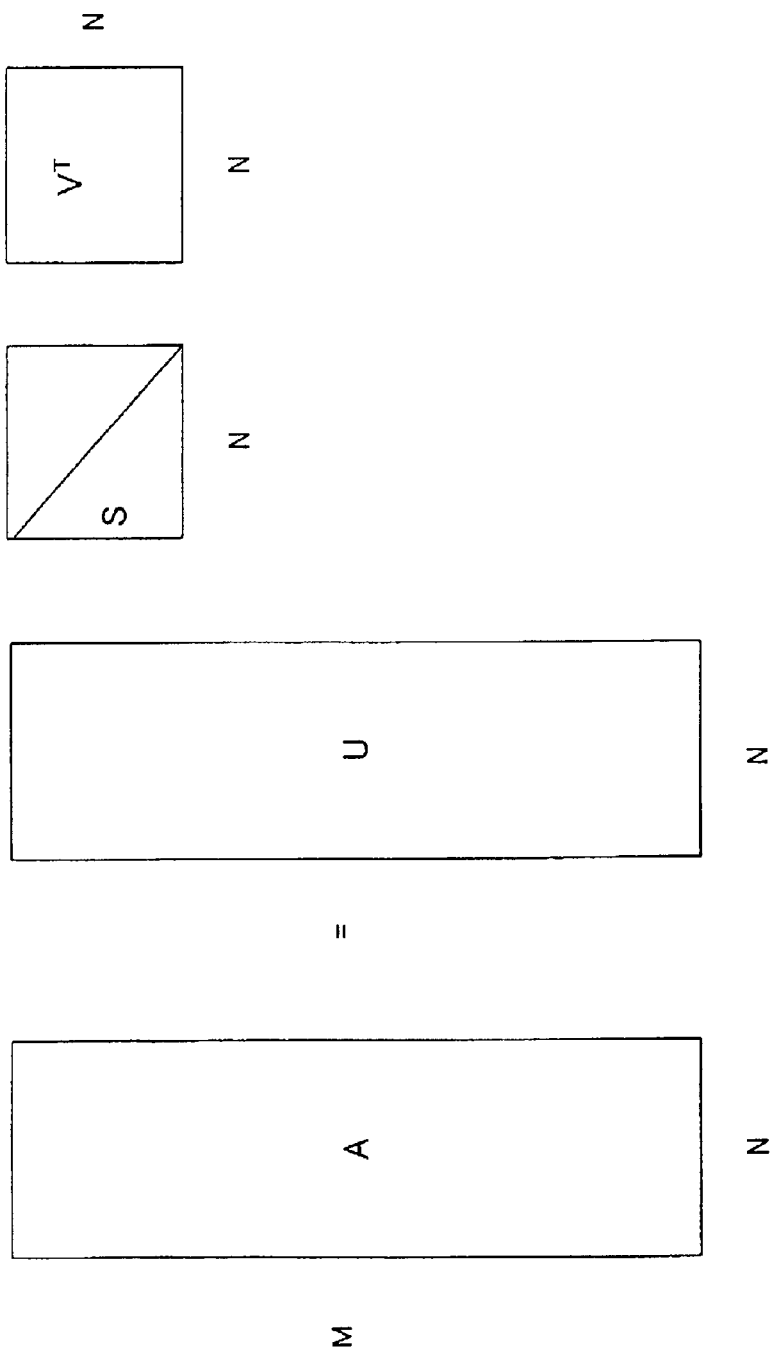
FIG. 4 shows yet another representative method for SVD.
Figure 5:
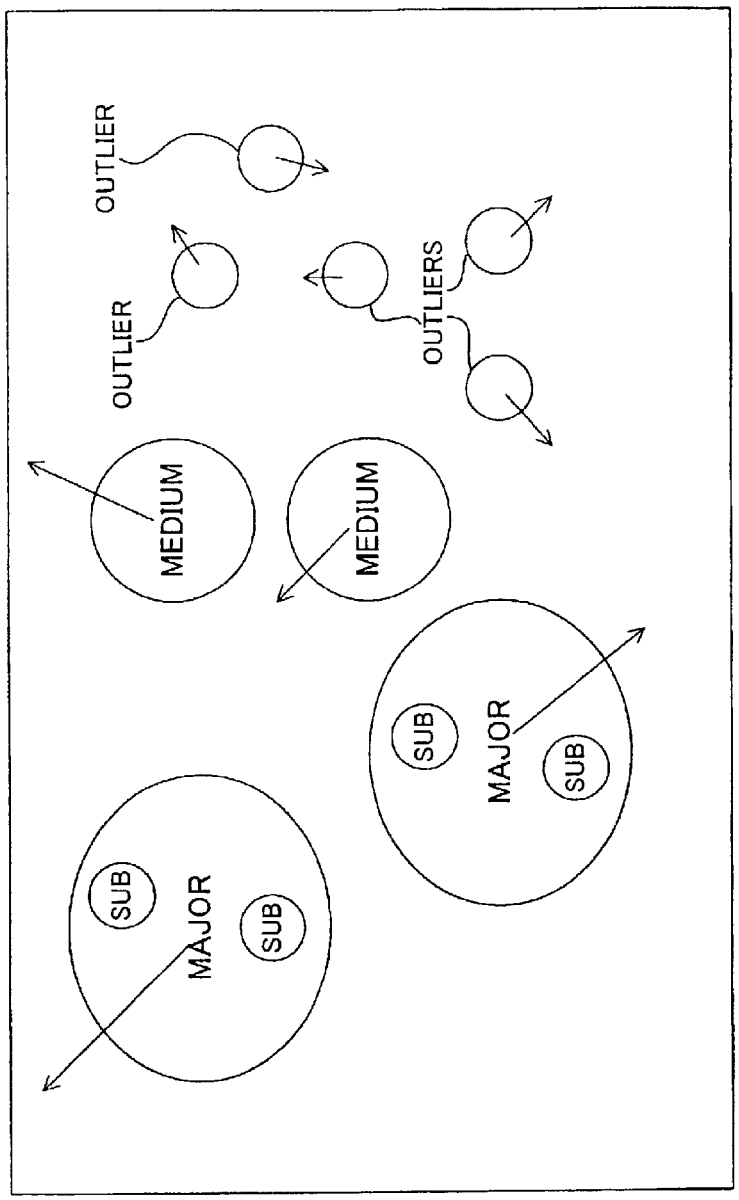
FIG. 5 shows a general construction of the document space D derived from the database. Each of the arrows starting from each cluster represents the largest basis vector of the respective cluster.
Figure 7:
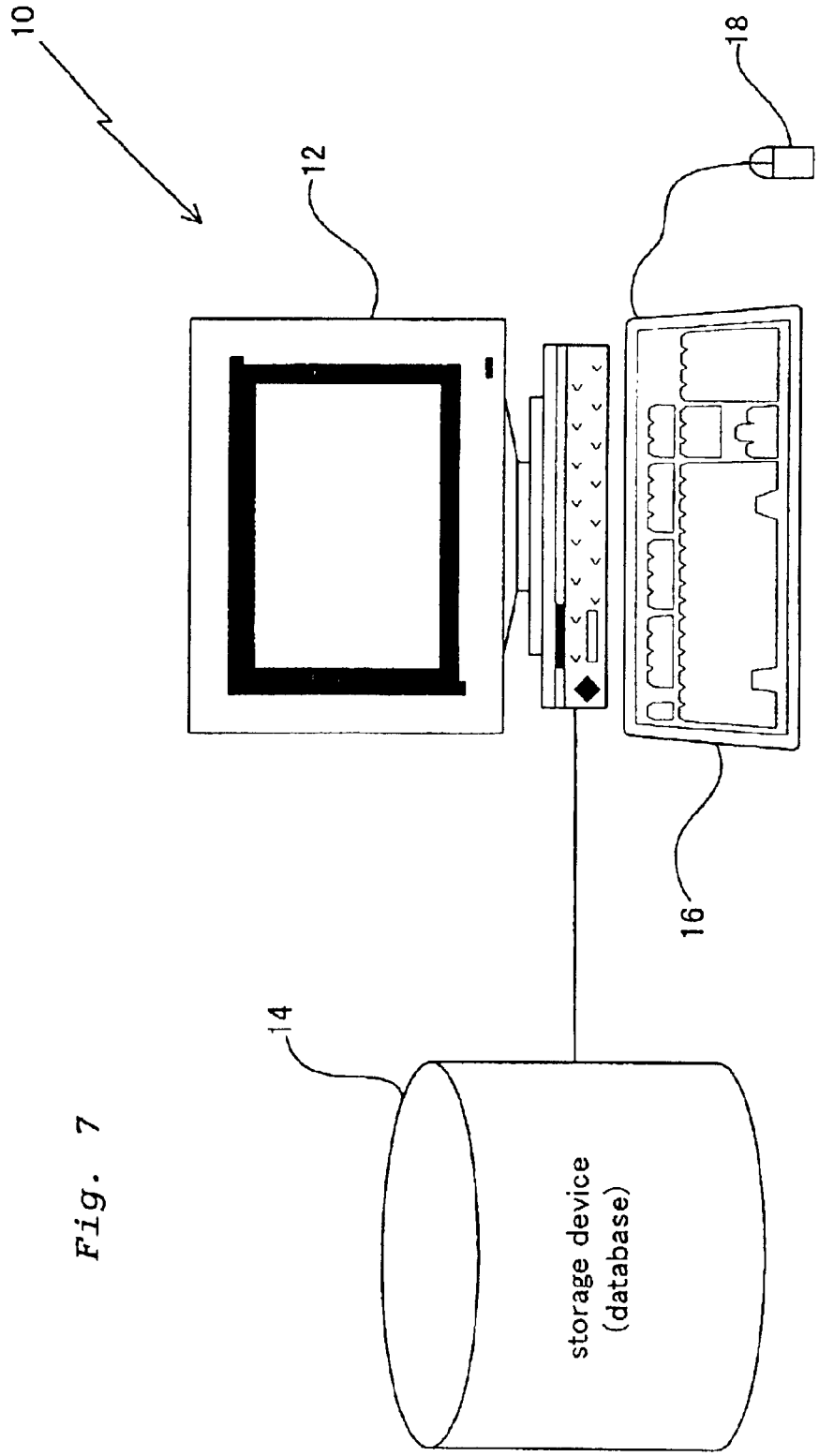
FIG. 7 shows an embodiment of a computer system to which a method of the present invention is implemented.

FIG. 7 shows a computer system to which a method of the present invention is implemented. The computer system 10 depicted in FIG. 7 generally comprises a computer 12, a storage device 14, an input device such as a keyboard 16, and a pointing device such as a mouse 18. The computer 12 comprises a central processing unit (not shown) and a necessary memory such as RAM and/or ROM for executing the method of the present invention Although the storage device 14 described in FIG. 7 is externally connected to the computer 12, the storage device 14 maybe included inside the computer 12 in a form of a hard-disk unit so far as the required memory capacity is ensured.

The storage device 14 retains documents to be retrieved or detected or identified and the documents therein may be formatted by a suitable database software well known in the art. The document matrix is created from the binary model using attributes included in the documents and is stored in an adequate memory space included in the computer system 10. In the present invention, the document to be retrieved may include text documents, audio files, image files, multimedia files, video files, Web Pages, any documents having a time stamp so as to providing time dependent retrieval and detection.

The computer may include a personal computer comprising a CPU such as PENTINUM series (TRADE MARK of INTEL Corporation) and/or a CPU compatible thereto and/or a workstation such as RS-6000 (TRADE MARK of International Business Machines) comprising POWER PC (TRADE MARK of Internal Business Machines Corporation) and/or a workstation compatible thereto, which can run WINDOWS (TRADE MARK of Microsoft Corporation), WINDOWS NT (TRADE MARK of Microsoft Corporation),OS/2, AIX WINDOWS (TRADE MARK of International Business Machines Corporation) and MAC OS (TRADE MARK of Apple Computer Corporation). but not limited thereto, any computer or workstation may be used in the present invention. In the present invention, the user of the computer system of the present invention may input his or her queries to the computer system 10 by the keyboard 16 and/or the mouse 18 as described below, however human-computer interaction for query input is not limited to the devices described hereto and may also include any input device which enables users to describe the query, such as a pen, stylus or joystick.

Upon receiving the request from the user, the computer system may switch the process for SVD between the Latent Semantic Indexing (LSI) method and the Covariance Matrix (COV) method upon request by user so that the user desired computation method may be served by the system depending on computation time, a system resource, and other conditions requested by the user of the computer system.

Figure 8:
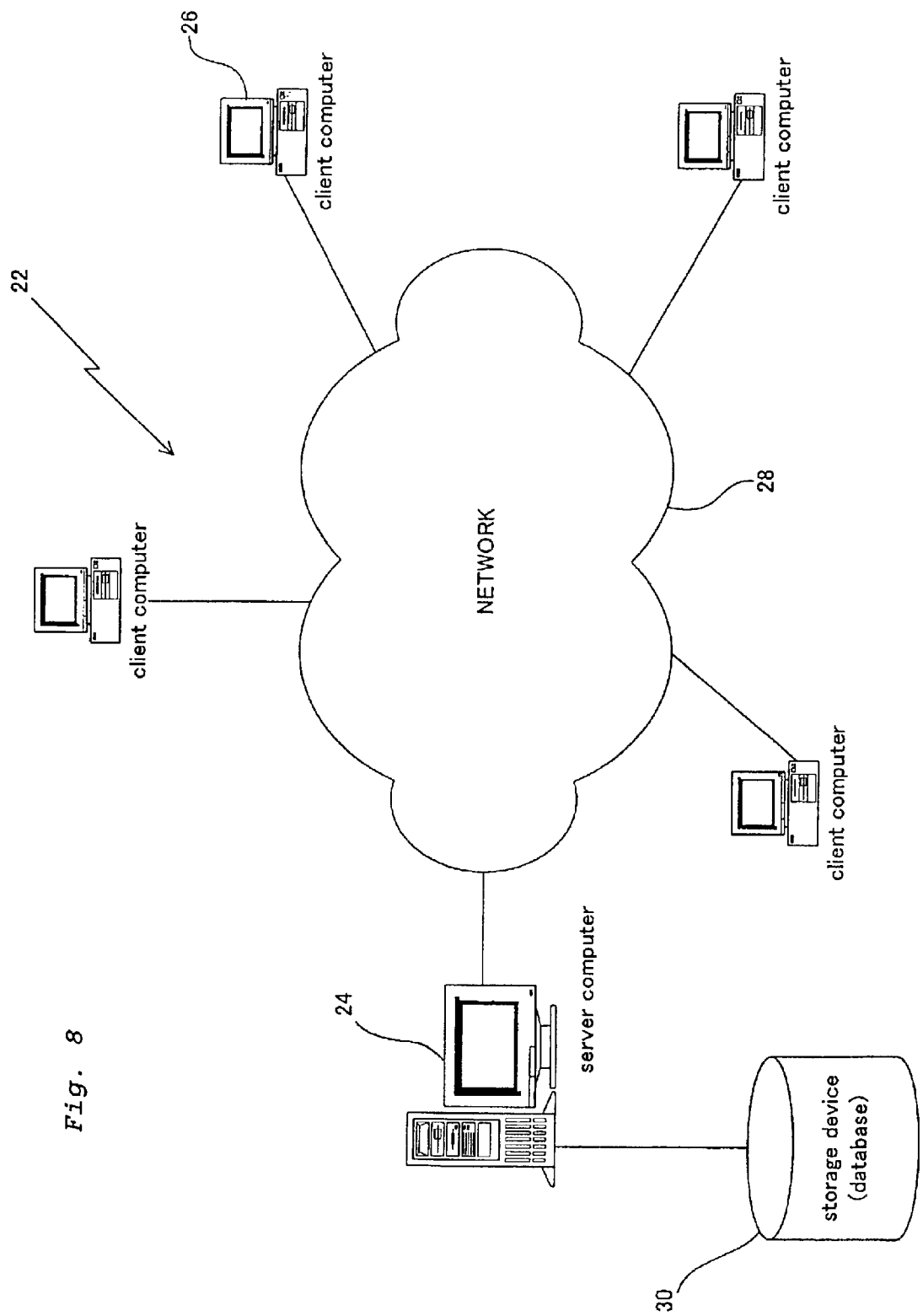
FIG. 8 shows another embodiment of a computer system to which a method of the present invention is implemented.

FIG. 8 shows an alternative embodiment of the computer system 22 according to the present invention. As shown in FIG. 8, the computer system 22 of the present invention may be implemented as a network system which allows transaction between a server computer 24 and a client computer 26. The server computer 24 communicates to a client computer 26 through a network 28 such that a client or clients are allowed to retrieve, detect and identification of the documents stored in the storage device 30 connected to the server computer 24. The server computer 24 is implemented a program for executing the method of the present invention, and the results of the retrieval, detection and identification are transmitted to the client computer 26 upon requested by the client computer 26 through the network 28 such as an internet infra-base, but not limited thereto, the network used in the present invention may include a local area network/a wide area network (LAN/WAN) communicating with TCP/IP protocol or any other suitable communication protocol, and any other network such as, for example, a light-communication, a satellite communication, or a ground-wave communication and the like.

Figure 9:
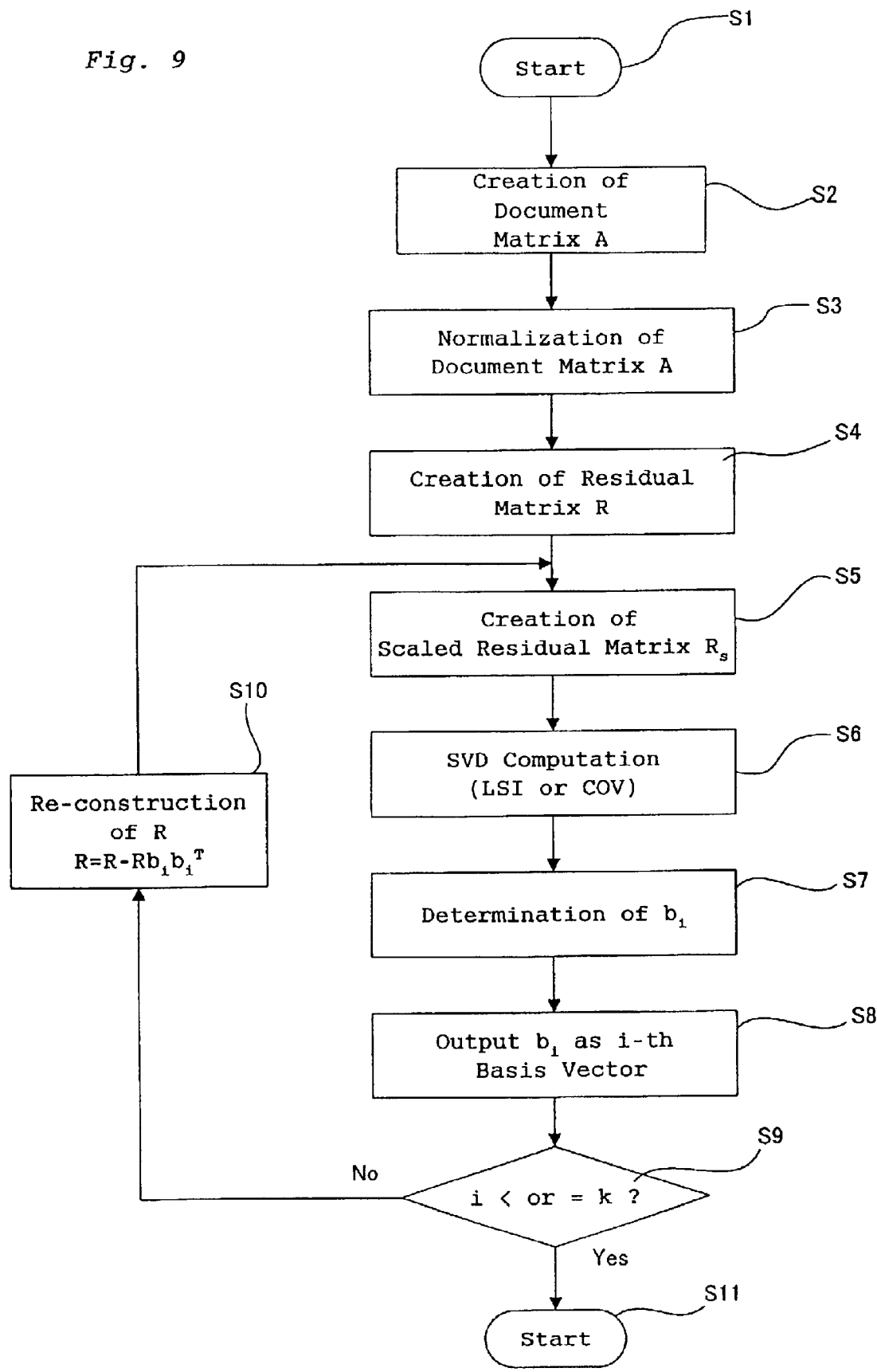
FIG. 9 shows a schematic flowchart of the method according to the present invention.

FIG. 9 shows a schematic flowchart of the method according to the present invention, which is executed by the computer system 10 or the server computer 24. The process of the present invention starts from the step S1 and proceeds to the Step S2 such that an M by N document matrix A is created according to the vector space model. In the present invention, a weight factor may be used together with a binary vector space model to enhance accuracy of the results. Here, M represents the number of the documents stored in the database and N represents the number of the attributes (used in the retrieval, detection and identification) selected by the system or user input.

Next, the process proceeds to the step S3 and executes normalization of the document matrix A so as to treat the documents in the database evenly, e.g., by setting the length of each document vector to one. Next the process proceeds to the Step S4 such that the residual matrix is defined. The initial matrix of the residual matrix A is set to the document matrix A so that it is ensured that the largest singular vector of the document matrix may be derived while being removed from the following iterations.

Further next, the process proceeds to the step S5 and computes the scaling factor q for the residual vectors $r_i$ using the largest norm of the residual vector $t_{max}$. The scaling factor q is determined each time the iteration cycle for obtaining the i-th basis vector is repeated and is provided by a predetermined function. The detail of the scaling function will be discussed later. The residual matrix and the residual vectors are defined by the following formula:

$$R=[r_1,\ldots,r_M]^T,$$

wherein R is the residual matrix, $r_i$ is an i-th residual vector, and "T" represents a transpose thereof. The scaling factor q is combined to the above residual vectors $r_i$ to create the scaled residual matrix $R_s$ by the following formula:

$$R_s=[|r_1|^q r_1,\ldots,|r_M|^q r_M]^T.$$

Referring to FIG. 9, the process of the present invention further proceeds to the Step S6 such that SVD computation of the scaled residual matrix $R_s$ is executed so as to determine the largest singular value for the subjected residual matrix $R_s$ and determine the corresponding singular vector $b_1$. In the present invention, the procedure of SVD may be selected between LSI and COV by user selection as shown in the step S6. In the present invention, it is preferred that the obtained i-th singular vector is further subjected to Gram-Schmidt orthogonalization (Golub, G. and Van Loan, C., Matrix Computation, third ed., Johns Hopkins Univ. Press, Baltimore, Md., 1983) to improve the accuracy.

Further next the process outputs the basis vector $b_1$ used for the dimension reduction to a suitable memory means such that the set of basis vectors is provided for the dimension reduction after the iteration cycle. The process further determines in the step S9 whether or not the whole number i is smaller than or equal to k. If i is smaller than or equal to k (no), the residual matrix R is re-constructed in the step S10. If i becomes larger than k (yes), the process proceeds to the step S11 to end.

The iteration of the Steps S4–S10 is continued until i becomes larger thank so that k-base vectors $\{b_1, b_2, b_k\}$ for the dimension reduction of the document matrix A is created in the process as described in FIG. 9.

FIG. 10 shows an embodiment of the detailed pseudo-code of the Steps S4–S10 described in FIG. 9 where the user selects the process of LSI for SVD. As shown in FIG. 10, the process first initializes the residual matrix R to be the M by N document matrix A as described in FIG. 9 and the whole number k to which the dimension of the document matrix is reduced. It is possible to introduce a normalization step for the document matrix A such that the document vectors may be treated evenly.

Next the process computes norms of residual vectors $r_i$ of the residual matrix R and then determines the scaling factor q is using a predetermined function of $t_{max}$ which is the largest norm of the residual vector defined as follows:

$$t_{max}=\max(|r_1|,\ldots,|r_m|)$$

The procedure of the present invention uses the value of $t_{max}$ to determine the scaling factor q, because we inventors have found experimentally that the scaling factor contributes to the problems which occur in the conventional retrieval and detection of the outlier clusters so that the largest value of the norm should be adjusted adequately.

Further next the process creates the scaled residual matrix $R_s$ in the M by N form according to the following formula:

$$R=[|r_1|^q r_1,\ldots,|r_M|^q r_M]^T$$

In the computation of the explained embodiment, the scaling factor q and the largest norm of the residual vector $r_{max}$ are double precision variables, but not limited thereto, and any precision level may be used so far as required accuracy of the retrieval and detection may be obtained.

Then the process executes the Singular Value Decomposition to the scaled residual matrix $R_s$ so as to obtain the basis vector $b_i$ as the first row the vector $V^T$. In the described pseudo-code, the basis vector is further subjected to the modified Gram-Schmidt orthogonalization (MGS) to enhance the accuracy, but not limited thereto, any other orthogonalization method may be used or such orthogonalization may not be included in the process whenever the orthogonality may be assured.

The process further executes the re-construction of the residual vector R from the computed basis vector $b_i$ according to the following equation:

$$R = R - R b_i b_i^T.$$

FIG. 11 shows a graphical representation of the function of the variable scaling factor q according to the present invention. The scaling of the present invention is shown in FIG. 11(a) and the conventional scaling is shown in FIG. 11(b).

As shown in FIG. 11(a), the present invention dynamically modifies the scaling factor q depending on the largest norm $t_{max}$ of the residual vector. The above modification prevents vectors of the outlier clusters other than the first found outlier cluster from degeneration as shown in FIG. 11(a) because the scaling factors are adjusted according to $t_{max}$ to avoid excess decrease of the norm of the residual vectors for each iteration cycle. In the particular embodiment of the present invention, the scaling factor q are determined by following function "func" depending on $t_{max}$ as follows:

$$q = func(t_{max}) \triangleq \begin{cases} \text{if } (t_{max} > 1) \text{ then } \dfrac{1}{t_{max}} \\ \text{if } (t_{max} \approx 1) \text{ then } P + t_{max}, \\ \text{if } (t_{max} < 1) \text{ then } \dfrac{1}{10^{2-t_{max}}} \end{cases}$$

wherein p represents a whole number and is selected to be preferably 1 in the preferred embodiment.

As shown in the above function, if $t_{max}$ is larger than 1, then the scaling factor q is set to be $1/t_{max}$; if $t_{max}$ is nearly equal to 1, then the scaling factor q is set to be $p+t_{max}$; and if $t_{max}$ is less than 1, then q is set to be $1/(10^{2-t_{max}})$. The scaling factor q of the present invention controls the scaling of the residual matrix such that the base vectors are not significantly affected by the largest residual vectors while ensuring the effect of the scaling adequately, but not limited thereto, the scaling factor q may be selected based on any relation other than the described scaling function so far as the scaling factors are changed in each of the iteration cycles for the determination of the basis vector.

On the other hand, as shown in FIG. 11(b), in the conventional scaling of the residual vector uses a constant scaling factor for each residual vector and for each iteration cycle, and when the norm of the residual vector is less than 1 and a positive whole number q larger than 1 are together used to scale the residual vectors, the residual vectors having the norm less than 1 become smaller and smaller with respect to the iteration cycle for computing the k-base vectors and result in the degeneration of the residual vectors around the noise level as shown in FIG. 11(b).

In the above described embodiment, the condition of $t_{max}$ being nearly equal to 1 is defined herein as follows:

$$|t_{max} - 1| < \epsilon$$

The value of $\epsilon$ may be selected depending on a particular application and typically selected to be about 0.01. However, the value of $\epsilon$ becomes large, the scaling tends to be similar to the conventional method.

Further advantage of the present invention is derived from the difference in the computation method of the basis vector for the dimension reduction. In the conventional method, the eigenvector has been computed by directly from the $R_s^T R_s$. Contradictory to the conventional method, the method of the present invention uses SVD and computes only the right singular vector corresponding to the largest singular value.

Therefore, the method according to the present invention may provide fast and real time retrieval and/or detection as well as ensuring accurate retrieval of the outlier clusters while saving the computer resources such as a performance of CPU and memory resources.

FIG. 12 depicts a pseudo-code for an alternative embodiment which uses COV for executing the SVD. The other procedure is the same as the embodiment described in FIG. 10, and hence detailed description other than COV will not provided herein. As described above, after the scaled residual matrix is calculated, a covariance matrix K is created as follows:

$$K = \frac{1}{M} \sum_{i=1}^{M} d_i d_i^T - (^{bar}d)(^{bar}d^T),$$

wherein $d_i$, $^{bar}d$, and $^{bar}d_i$ are defined as follows:

$$d_i = \begin{bmatrix} a_{i,1} \\ \vdots \\ a_{i,N} \end{bmatrix}, \quad ^{bar}d = \begin{bmatrix} ^{bar}d_1 \\ \vdots \\ ^{bar}d_N \end{bmatrix}, \quad ^{bar}d_i = \frac{1}{M} \sum_{j=1}^{M} a_{j,i}$$

Then the SVD of the created covariance matrix is computed to determine the basis vectors f or reducing the dimension of the document matrix A. The inventors have found earlier that major singular vectors of the covariance matrix have substantially the same direction as the singular vectors of the document matrix and hence COV is particularly effective in reducing the dimension of matrices which model a very large database. In the described alternative embodiment, the covariance matrix K becomes dense matrix, however, the covariance matrix K becomes a square N by N matrix, and therefore, SVD computation is executed in significantly short computation time, because the number of the attributes are typically 2 orders less than the document number because the document number M is large.

The procedure of FIG. 12 further proceeds to the re-construction of the residual matrix R and the iteration cycle as described in FIG. 10 and is repeated to determine k-base vectors.

Herein below, the present invention will be explained using particular examples which are provided only for explanation of the present invention rather than the limitations of the present invention.

EXAMPLE

A sample database including 140 documents and 40 keyword sets was constructed. The documents and the keywords were as follows:

<Contents of 140 documents>

(1) Documents relating to the keyword "Clinton"  25 documents
    documents only having "Clinton" + "Al Gore"  10 documents
    documents only having "Clinton" + "Hillary"  5 documents
    documents having all of "Clinton" + "Al Gore" + "Hillary"  10 documents
    (documents No. 1–25)
(2) Documents relating to the keyword "Java"  25 documents
    documents only having "Java" + "JSP"  10 documents
    documents only having "Java" + "applet"  5 documents
    documents having all of "Java" + "JSP" + "Java" + "JSP" + "applet"  10 documents
    (documents No. 26–50)

The documents listed below are outlier clusters:

(3) Documents relating to the keyword "Bluetooth"  5 documents
    (documents No. 51–55)
(4) Documents relating to the keyword "soccer"  5 documents
    (documents No. 56–60)
(5) Documents relating to the keyword "matrix"  5 documents
    (documents No. 61–65)
(6) Documents relating to the keyword "DNA"  5 documents
    (documents No. 66–70)

The documents listed below are noise:

(7) Documents not categorized into the above clusters  70 documents
    (documents No. 71–140)

The major clusters herein are named as "Clinton" cluster and "Java" cluster. These significant (major) clusters include classified sub-clusters such as "Clinton"+"Hillary" and "Java"+"applet" sub-clusters which together include 5 documents. On the other hand, the subjected outlier clusters are isolated clusters each including 5 documents. It is noted that the cluster "Clinton"+"Hillary" and the cluster "Java"+"applet" each include 5 documents, however, the "Clinton"+"Hillary" and "Java"+"applet" clusters are sub-clusters included in the "Clinton" or "Java" (major) clusters while the outlier clusters each include 5 documents. And hence, in the sample database, the "Clinton"+"Hillary" and "Java"+"applet" clusters are not categorized into outlier clusters. The sub-clusters and the outlier clusters each including 5 documents are included in the 140 documents, and then each ratio of the sub-clusters and the outlier clusters is only 3.5%. Keywords used in the example were listed in FIG. 13.

In the example, we examined whether or not the outlier clusters are retrieved using the dimensional reduction procedure for the usual vector space model. Elements of the original matrix of 140 by 40 dimensions are constructed with 0 or positive real numbers depending on the relevancy of the attributes (i.e., keywords) to the documents using the weight factor which depends on appearance of the attributes.

Figure 14:
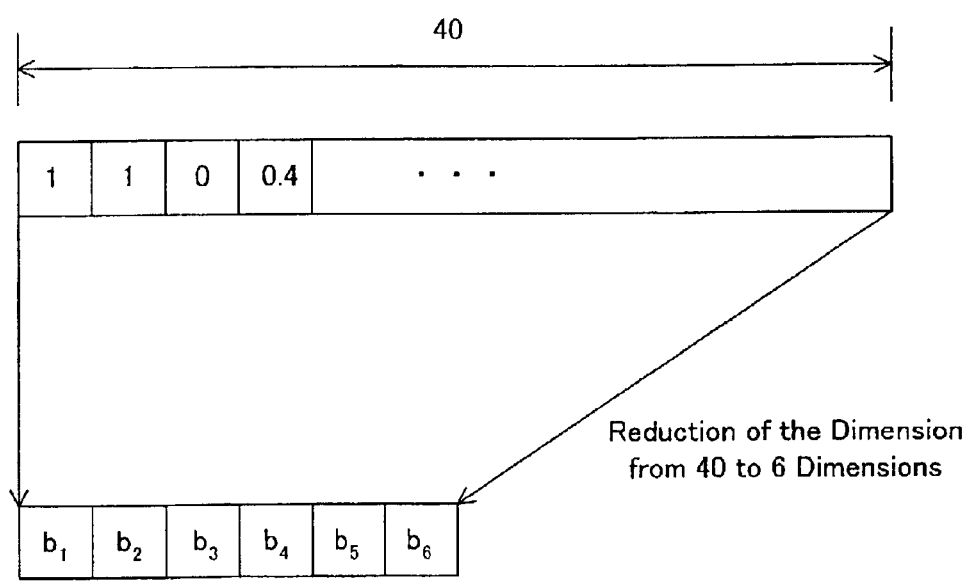
FIG. 14 shows an arrangement of elements in a document-keyword space.

FIG. 14 shows a typical arrangement of the elements in the document-keyword space. In FIG. 14, the elements for the document 001 represented by "11.021.040.4" is described. The representation of the document is paired as (position of non-zero elements, weight) and the position having the elements of zero is omitted to simplify the representation. The value of the weight factor which depends on appearance of the attributes is set higher as the relevancy to the keyword becomes high. The ordering of the keyword was those described in the numbering listed in FIG. 14; that is the position 1 corresponds to the keyword "Clinton", and the position 4 corresponds to the keyword "Chelsea" and so on. The document was reduced in its dimension to 6 using the computed basis vectors derived by the scaling according to the present invention. The elements of each documents in the sample database are listed in TABLE I.

TABLE I

<Elements of the Documents>

| DOCUMENT NO. | ELEMENTS |
|---|---|
| 001 | 1 1.0 2 1.0 4 0.4 |
| 002 | 1 1.0 2 1.0 5 0.3 |
| 003 | 1 1.0 2 1.0 6 0.1 |
| 004 | 1 1.0 2 1.0 4 0.3 |
| 005 | 1 1.0 2 1.0 6 0.2 |
| 006 | 1 1.0 2 1.0 4 0.2 |
| 007 | 1 1.0 2 1.0 6 0.1 |
| 008 | 1 1.0 2 1.0 4 0.1 |
| 009 | 1 1.0 2 1.0 6 0.2 |
| 010 | 1 1.0 2 1.0 |
| 011 | 1 1.0 2 1.0 3 0.5 5 0.3 |
| 012 | 1 1.0 2 1.0 3 0.5 4 0.4 |
| 013 | 1 1.0 2 1.0 3 0.5 6 0.1 |
| 014 | 1 1.0 2 1.0 3 0.5 |
| 015 | 1 1.0 2 1.0 3 0.5 5 0.3 |
| 016 | 1 1.0 2 0.5 3 1.0 4 0.1 |
| 017 | 1 1.0 2 0.5 3 1.0 4 0.4 |
| 018 | 1 1.0 2 0.5 3 1.0 6 0.1 |
| 019 | 1 1.0 2 0.5 3 1.0 |
| 020 | 1 1.0 2 0.5 3 1.0 5 0.3 6 0.2 |
| 021 | 1 1.0 3 1.0 6 0.1 |
| 022 | 1 1.0 3 1.0 4 0.4 |
| 023 | 1 1.0 3 1.0 |
| 024 | 1 1.0 3 1.0 5 0.3 |
| 025 | 1 1.0 3 1.0 4 0.4 |
| 026 | 7 1.0 9 1.0 10 0.1 11 0.4 |
| 027 | 7 1.0 9 1.0 11 0.3 |
| 028 | 7 1.0 9 1.0 10 0.2 |
| 029 | 7 1.0 9 1.0 |
| 030 | 7 1.0 9 1.0 10 0.1 |
| 031 | 7 1.0 9 1.0 11 0.2 |
| 032 | 7 1.0 9 1.0 10 0.3 |
| 033 | 7 1.0 9 1.0 |
| 034 | 7 1.0 9 1.0 11 0.1 |
| 035 | 7 1.0 9 1.0 10 0.1 |
| 036 | 7 1.0 8 0.5 9 1.0 11 0.2 |
| 037 | 7 1.0 8 0.5 9 1.0 |
| 038 | 7 1.0 8 0.5 9 1.0 10 0.2 |
| 039 | 7 1.0 8 0.5 9 1.0 11 0.1 |
| 040 | 7 1.0 8 0.5 9 1.0 |
| 041 | 7 1.0 8 1.0 9 0.5 10 0.1 |
| 042 | 7 1.0 8 1.0 9 0.5 11 0.3 |
| 043 | 7 1.0 8 1.0 9 0.5 11 0.2 |
| 044 | 7 1.0 8 1.0 9 0.5 11 0.1 |
| 045 | 7 1.0 8 1.0 9 0.5 |
| 046 | 7 1.0 8 1.0 10 0.1 |
| 047 | 7 1.0 8 1.0 |
| 048 | 7 1.0 8 1.0 11 0.3 |
| 049 | 7 1.0 8 1.0 10 0.2 |
| 050 | 7 1.0 8 1.0 11 0.1 |
| 051 | 12 1.0 18 0.1 |
| 052 | 12 1.0 21 0.1 |
| 053 | 12 1.0 24 0.1 |
| 054 | 12 1.0 35 0.1 |
| 055 | 12 1.0 |
| 056 | 13 1.0 19 0.1 |
| 057 | 13 1.0 22 0.1 |
| 058 | 13 1.0 28 0.1 |
| 059 | 13 1.0 33 0.1 |
| 060 | 13 1.0 |
| 061 | 14 1.0 16 0.1 |
| 062 | 14 1.0 23 0.1 |
| 063 | 14 1.0 29 0.1 |

TABLE I-continued

<Elements of the Documents>

| DOCUMENT NO. | ELEMENTS |
|---|---|
| 064 | 14 1.0 37 0.1 |
| 065 | 14 1.0 |
| 066 | 15 1.0 17 0.1 |
| 067 | 15 1.0 25 0.1 |
| 068 | 15 1.0 30 0.1 |
| 069 | 15 1.0 38 0.1 |
| 070 | 15 1.0 |
| 071 | 21 0.3 29 0.4 33 0.2 37 1.0 |
| 072 | 19 0.2 28 0.3 29 0.2 33 0.3 36 0.2 38 1.0 |
| 073 | 20 0.2 32 0.2 35 0.2 39 1.0 |
| 074 | 16 0.3 22 0.4 23 0.2 26 0.1 28 0.3 40 1.0 |
| 075 | 16 1.0 18 0.2 40 0.3 |
| 076 | 17 1.0 26 0.2 27 0.4 40 0.1 |
| 077 | 16 0.2 18 1.0 22 0.3 23 0.4 24 0.2 27 0.2 29 0.4 34 0.3 36 0.2 |
| 078 | 19 1.0 22 0.1 25 0.3 29 0.4 33 0.3 34 0.4 35 0.4 |
| 079 | 20 1.0 22 0.1 24 0.3 25 0.3 |
| 080 | 21 1.0 29 0.3 33 0.2 35 0.2 36 0.2 |
| 081 | 22 1.0 26 0.4 34 0.4 35 0.2 |
| 082 | 23 1.0 30 0.3 37 0.3 |
| 083 | 20 0.3 24 1.0 |
| 084 | 22 0.3 25 1.0 30 0.2 38 0.4 |
| 085 | 22 0.1 26 1.0 29 0.2 31 0.2 34 0.3 36 0.3 |
| 086 | 18 0.2 25 0.3 26 0.1 27 1.0 34 0.3 35 0.3 |
| 087 | 27 0.2 28 1.0 |
| 088 | 17 0.3 23 0.4 29 1.0 37 0.4 40 0.4 |
| 089 | 18 0.4 24 0.3 27 0.3 29 0.3 30 1.0 37 0.2 |
| 090 | 16 0.3 17 0.2 25 0.3 27 0.3 29 0.2 31 1.0 33 0.3 35 0.3 |
| 091 | 20 0.2 25 0.1 30 0.3 32 1.0 36 0.4 |
| 092 | 19 0.2 20 0.3 26 0.4 28 0.2 33 1.0 35 0.4 |
| 093 | 17 0.3 34 1.0 |
| 094 | 21 0.4 30 0.3 34 0.3 35 1.0 38 0.4 |
| 095 | 17 0.4 20 0.4 21 0.3 23 0.4 27 0.4 36 1.0 |
| 096 | 18 0.3 22 0.2 29 0.2 37 1.0 39 0.2 |
| 097 | 18 0.2 23 0.3 24 0.3 29 0.2 32 0.3 36 0.2 38 1.0 |
| 098 | 18 0.2 28 0.3 39 1.0 |
| 099 | 40 1.0 |
| 100 | 16 1.0 18 0.3 20 0.2 26 0.3 30 0.3 37 0.3 39 0.3 |
| 101 | 17 1.0 20 0.4 24 0.2 26 0.2 27 0.2 30 0.4 36 0.4 38 0.2 |
| 102 | 18 1.0 19 0.3 30 0.2 |
| 103 | 19 1.0 25 0.2 31 0.3 33 0.3 36 0.4 |
| 104 | 18 0.2 20 1.0 22 0.4 23 0.3 33 0.3 37 0.4 38 0.4 40 0.2 |
| 105 | 19 0.2 21 1.0 22 0.2 25 0.1 37 0.2 |
| 106 | 22 1.0 28 0.2 32 0.4 37 0.4 |
| 107 | 21 0.3 23 1.0 34 0.3 40 0.2 |
| 108 | 24 1.0 |
| 109 | 19 0.3 24 0.1 25 1.0 27 0.4 30 0.3 |
| 110 | 20 0.4 26 1.0 28 0.4 30 0.4 35 0.2 |
| 111 | 24 0.3 25 0.1 27 1.0 29 0.3 |
| 112 | 26 0.3 28 1.0 30 0.3 35 0.4 40 0.4 |
| 113 | 16 0.4 20 0.4 24 0.3 29 1.0 32 0.2 33 0.1 35 0.4 |
| 114 | 23 0.4 30 1.0 35 0.3 |
| 115 | 31 1.0 34 0.4 |
| 116 | 26 0.3 32 1.0 39 0.4 |
| 117 | 33 1.0 35 0.2 36 0.2 37 0.2 38 0.2 |
| 118 | 17 0.2 22 0.2 27 0.2 31 0.2 34 1.0 |
| 119 | 18 0.2 35 1.0 |
| 120 | 28 0.1 33 0.3 35 0.2 36 1.0 38 0.3 |
| 121 | 37 1.0 |
| 122 | 18 0.4 19 0.2 20 0.3 22 0.3 23 0.3 38 1.0 39 0.3 |
| 123 | 20 0.3 29 0.2 34 0.2 39 1.0 |
| 124 | 16 0.3 17 0.3 23 0.3 25 0.4 33 0.4 34 0.3 36 0.2 37 0.4 39 0.2 40 1.0 |
| 125 | 16 1.0 17 0.4 19 0.2 24 0.3 27 0.2 31 0.1 32 0.1 36 0.3 39 0.1 |
| 126 | 17 1.0 23 0.2 26 0.4 28 0.2 39 0.3 |
| 127 | 18 1.0 27 0.2 33 0.3 35 0.2 |
| 128 | 19 1.0 24 0.2 26 0.2 30 0.1 33 0.2 |
| 129 | 20 1.0 21 0.2 31 0.2 33 0.2 |
| 130 | 21 1.0 36 0.2 37 0.3 |
| 131 | 16 0.4 22 1.0 30 0.3 32 0.3 35 0.2 37 0.4 |
| 132 | 23 1.0 28 0.3 30 0.3 33 0.3 40 0.2 |
| 133 | 24 1.0 33 0.4 35 0.2 38 0.4 |
| 134 | 23 0.3 25 1.0 35 0.2 38 0.4 39 0.2 40 0.4 |
| 135 | 17 0.2 18 0.3 22 0.3 24 0.2 26 1.0 38 0.4 |

TABLE I-continued

<Elements of the Documents>

| DOCUMENT NO. | ELEMENTS |
|---|---|
| 136 | 16 0.3 18 0.1 21 0.2 25 0.3 27 1.0 36 0.2 |
| 137 | 23 0.2 26 0.2 28 1.0 |
| 138 | 29 1.0 31 0.4 38 0.3 40 0.4 |
| 139 | 18 0.1 26 0.2 28 0.3 29 0.3 30 1.0 33 0.2 35 0.1 |
| 140 | 24 0.1 26 0.2 31 1. |

Example 1

<Result of Algorithm 1>

The above constructed sample database was subjected to the present method to reduce the dimension thereof according to the algorithm 1. The dimension of the sample document matrix was reduced to 40 keyword dimensions to 6 keyword dimensions using the scaled residual matrix according to the present invention. The measure of the relevancy, that is, "similarity average" for the k-th cluster $\Omega_k$ was calculated to eliminate random input of the keywords according to the following formula:

$$\text{similarity average } (SA)_k = \frac{1}{\binom{|\Omega_k|}{2}} \sum_{i>j, i,j \in \Omega_k} {}^{hat}d_i \cdot {}^{hat}d_j,$$

Table II shows the result of the present method for retrieving and detecting according to the algorithm 1.

TABLE II

Results of the present invention

| | Cluster name | SA | Document No. |
|---|---|---|---|
| 1 | Java + JSP + applet cluster | 0.911 | 10 |
| 2 | Clinton + Al Gore + Hillary cluster | 0.898 | 10 |
| 3 | Bluetooth cluster (outlier) | 0.881 | 5 |
| 4 | Clinton + Al Gore cluster | 0.834 | 10 |
| 4 | Java + JSP cluster | 0.834 | 10 |
| 6 | Java cluster | 0.818 | 25 |
| 7 | Clinton cluster | 0.810 | 25 |
| 8 | Matrix cluster (outlier) | 0.763 | 5 |
| 9 | Soccer cluster (outlier) | 0.673 | 5 |
| 10 | DNA cluster (outlier) | 0.661 | 5 |
| 11 | Java + applet cluster | 0.621 | 5 |
| 12 | Clinton + Hillary cluster | 0.609 | 5 |

As shown in Table II, the outlier clusters are preserved during the dimension reduction process using the present method and the outlier clusters are successfully detected, retrieved and identified.

Example 2

<Result of Algorithm 2>

The above constructed sample database was further subjected to the present method to reduce the dimension thereof according to the algorithm 2 while keeping other conditions. The computed results are listed in Table III and are also represented as the similarity average (SA).

TABLE III

Results of the present invention

| | Cluster name | SA | Document No. |
|---|---|---|---|
| 1 | Java + JSP + applet cluster | 1.084 | 10 |
| 2 | Clinton + Al Gore + Hillary cluster | 1.019 | 10 |
| 3 | Java cluster | 0.915 | 25 |
| 4 | Java + JSP cluster | 0.891 | 10 |
| 5 | Clinton cluster | 0.860 | 25 |
| 6 | DNA cluster (outlier) | 0.849 | 5 |
| 7 | Matrix cluster | 0.840 | 5 |
| 8 | Clinton + Al Gore cluster | 0.836 | 10 |
| 9 | Soccer cluster (outlier) | 0.793 | 5 |
| 10 | Bluetooth cluster (outlier) | 0.776 | 5 |
| 11 | Java + applet cluster | 0.661 | 5 |
| 12 | Clinton + Hillary cluster | 0.624 | 5 |

As shown in Table III, all of the outlier clusters are retrieved and detected with a higher relevancy score and hence the method according to the present invention is quite effective in detecting, retrieving and identifying the outlier clusters.

Comparative Example

The inventors examined the effectiveness of the method of the present invention in further experiments by comparing results obtained by the conventional method using the same sample database and the same evaluation method.

In the comparable example, the sample database was subjected to the dimension reduction methods of LSI, COV, and Ando's scaling method (adopting the scaling factor q=2). Each of the results are listed in Table IV–Table VI. As shown in the Table IV, which summarizes the results from using LSI, the rankings of the outlier clusters are low and the similarity averages are as low as the noise levels. When COV is used, as listed in Table V, the values of the similarity averages increased significantly above the noise level, however, the ranking of the outlier cluster is still low.

As shown in Table VI, Ando's scaling method improves the similarity averages of the outlier clusters slightly, however, some outlier clusters still have small similarity averages, and the method has minor applicability to detection, retrieval and identification of outlier clusters in large databases when considering the destructive effect on the computation and consumption of the computer resources.

TABLE IV

Result of conventional LSI

| | Cluster name | SA | Document No. |
|---|---|---|---|
| 1 | Java + JSP cluster | 0.981 | 10 |
| 2 | Clinton + Al Gore cluster | 0.979 | 10 |
| 3 | Java + applet cluster | 0.976 | 5 |
| 4 | Clinton + Hillary cluster | 0.961 | 5 |
| 5 | Java + JSP + applet cluster | 0.923 | 10 |
| 6 | Clinton + Al Gore + Hillary cluster | 0.910 | 10 |
| 7 | Java cluster | 0.810 | 25 |
| 8 | Clinton cluster | 0.804 | 25 |
| 9 | Matrix cluster (outlier) | 0.028 | 5 |
| 10 | DNA cluster (outlier) | 0.007 | 5 |
| 11 | Bluetooth cluster (outlier) | 0.003 | 5 |
| 12 | Soccer cluster (outlier) | 5e – 4 | 5 |

TABLE V

Result of conventional COV

| | Cluster name | SA | Document No. |
|---|---|---|---|
| 1 | Clinton + Al Gore + Hillary cluster | 1.894 | 10 |
| 2 | Java + applet + JSP cluster | 1.890 | 10 |
| 3 | Clinton cluster | 1.601 | 25 |
| 4 | Java cluster | 1.597 | 25 |
| 5 | Clinton + Al Gore cluster | 1.566 | 10 |
| 6 | Java + JSP cluster | 1.565 | 10 |
| 7 | Clinton + Hillary cluster | 1.149 | 5 |
| 8 | Java + applet cluster | 1.143 | 5 |
| 9 | DNA cluster (outlier) | 0.914 | 5 |
| 10 | Soccer cluster (outlier) | 0.912 | 5 |
| 11 | Bluetooth cluster (outlier) | 0.909 | 5 |
| 12 | Matrix cluster (outlier) | 0.902 | 5 |

TABLE VI

Result of Conventional Scaling

| | Cluster name | SA | Document No. |
|---|---|---|---|
| 1 | Matrix cluster (outlier) | 0.993 | 5 |
| 2 | DNA cluster (outlier) | 0.993 | 5 |
| 3 | Java + applet + JSP cluster | 0.911 | 10 |
| 4 | Clinton + Al Gore + Hillary cluster | 0.898 | 10 |
| 5 | Java + JSP cluster | 0.834 | 10 |
| 5 | Clinton + Al Gore cluster | 0.834 | 10 |
| 7 | Java cluster | 0.818 | 25 |
| 8 | Clinton cluster | 0.810 | 25 |
| 9 | Java + applet cluster | 0.621 | 5 |
| 10 | Clinton + Hillary cluster | 0.609 | 5 |
| 11 | Cluetooth cluster (outlier) | 0.516 | 5 |
| 12 | Soccer cluster (outlier) | 0.477 | 5 |

The above results are summarized in Table VII, where $b_i$ denotes an i-th basis vector, C denotes the Clinton (major) cluster; J denotes the Java (major) cluster; N denotes the Noise; O denotes the outlier clusters (all), B denotes the Bluetooth outlier cluster; S denotes the Soccer outlier cluster; M denotes the Matrix outlier cluster; and D denotes the DNA outlier cluster. The summary listed in Table VII corresponds to the basis vectors by which each of the clusters was found. As shown in Table VII, the conventional scaling method finds the first outlier cluster when the fourth basis vector $b_4$ is used, however, the method according to the present invention succeeds in finding the outliter clusters with the higher basis vectors such as $b_3$ or even $b_2$ in the algorithm 2.

TABLE VII

Summary of the Five Algorithm

| | LSI | COV | Prior scaling | Algorithm 1 | Algorithm 2 |
|---|---|---|---|---|---|
| $b_1$ | C | C + J | J | J | C + J |
| $b_2$ | J | C + J | C | C | N + O + C + J |
| $b_3$ | N | N + O | N | N | M + D |
| $b_4$ | C | O + N | B + S | M + D | O |
| $b_5$ | J | O + N | M + D | B + S | B + S |
| $b_6$ | N | O + N | M + D | O | N + O |

As described above, the present invention can provide a method for retrieving, detecting and identifying the outlier clusters even when a plurality of outlier clusters are included in the document. The method of the present invention may be effective in retrieving, detecting and identifying outlier clusters as well as retrieving, detecting, and identifying the accumulated documents after a certain period such as inquiry information for new product.

Herein above, the present invention has been described with respect to the specific embodiments thereof. However, a person skilled in the art may appreciate that various omissions, modifications, and other embodiments are possible within the scope of the present invention.

The present invention has been explained in detail with respect to the method for retrieving, detecting and identifying, however, the present invention also contemplates to include a system for executing the method described herein, a method itself, and a computer readable medium within which the program for executing the method according to the present invention may be stored such as for example, optical, magnetic, magneto-electronic media. The true scope can be determined only by the claims appended.

What is claimed is:

1. A method for retrieving, detecting and identifying documents in a database, said documents in said database being constructed as a document matrix from attributes included in said documents, said method comprising steps of;
    creating said document matrix from said documents using at least one attribute;
    creating a scaled residual matrix based on said document matrix from a predetermined function;
    executing singular value decomposition to obtain a basis vector corresponding to the largest singular value;
    re-constructing said residual matrix and scaling dynamically said re-constructed residual matrix to obtain another basis vector;
    repeating said singular value decomposition step to said re-constructing step to create a predetermined set of basis vectors; and
    executing dimension reduction of said document matrix to perform detection, retrieval and identification of said documents in said database.

2. The method according to the claim 1, wherein said scaled residual matrix is created according to the following equation:

$$R_s = [|r_1|^q r_1, \ldots, |r_M|^q r_M]^T$$

wherein $R_s$ is the scaled residual matrix, $r_i$ is a residual vector, i is a whole number mot more than a document munber M, $|r_i|$ is a norm of said residual vector, T represents the transpose operation performed on vectors and q is a scaling factor dynamically determined according to said predetermined function.

3. The method according to the claim 1, wherein said singular value decomposition is alternatively selected by a user between a latent semantic indexing method and a covariance matrix method.

4. The method according to the claim 1, wherein said predetermined function is a function of the largest norm of said residual vector provided by the following equation:

$$q = func(t_{max}) \triangleq \begin{cases} \text{if } (t_{max} > 1) \text{ then } \dfrac{1}{t_{max}} \\ \text{if } (t_{max} \approx 1) \text{ then } P + t_{max}, \\ \text{if } (t_{max} < 1) \text{ then } \dfrac{1}{10^{2-t_{max}}} \end{cases}$$

wherein p is a whole number, $t_{max}$ is the largest norm of said residual vectors.

5. The method according to the claim 1, wherein the method further comprising a step for orthogonalizing said basis vector (with respect to the other, heretofore computed basis vectors) prior to said step for re-constructing said residual matrix.

6. The method according to the claim 1, wherein said scaling step uses a different scaling factor for each step for obtaining said basis vectors.

7. The method according to the claim 1, wherein said document matrix comprises a plurality of clusters with respect to said attributes and said clusters is at least categorized into a major cluster, a medium cluster and an outlier cluster.

8. A computer system for retrieving, detecting, and identifying documents in a database, said documents in said database being constructed as a document matrix from attributes included in said documents, said computer system comprises;
    means for creating said document matrix from said documents using at least one attribute;
    means for scaling said residual matrix based on said document matrix from a predetermined function;
    means for executing singular value decomposition to obtain a basis vector corresponding to the largest singular value;
    means for re-constructing said residual matrix and scaling dynamically said re-constructed residual matrix to obtain another basis vectors;
    means for repeating said singular value decomposition step to said re-constructing step to create a predetermined set of basis vector; and
    means for executing dimension reduction of said document matrix to perform detection, retrieval, and identification of said documents in said database.

9. The computer system according to the claim 8, wherein said means for scaling said residual matrix scales said residual matrix according to the following equation:

$$R_s = [|r_1|^q r_1, \ldots, |r_M|^q r_M]^T$$

wherein $R_s$ is the scaled residual matrix, $r_i$ is a residual vector, i is a whole number mot more than a document munber M, $|r_i|$ is a norm of said residual vector, T represents the transpose operation on performed on vectors, and q is a scaling factor dynamically determined according to said predetermined function.

10. The computer system according to the claim 8, wherein said means for executing singular value decomposition is alternatively selected by a user between a latent semantic indexing method and a covariance matrix method.

11. The computer system according to the claim 8, wherein said predetermined function is a function of the largest norm of said residual vector provided by the following equation:

$$q = func(t_{max}) \triangleq \begin{cases} \text{if } (t_{max} > 1) \text{ then } \dfrac{1}{t_{max}} \\ \text{if } (t_{max} \approx 1) \text{ then } P + t_{max}, \\ \text{if } (t_{max} < 1) \text{ then } \dfrac{1}{10^{2-t_{max}}} \end{cases}$$

wherein p is a whole number, $t_{max}$ is the largest norm of said residual vectors.

12. The computer system according to the claim 8, wherein the computer system further comprises means for orthogonalizing said basis vector (with respect to the other previously computed basis vectors) prior to said step for re-constructing said residual matrix.

13. The computer system according to the claim 8, wherein said means for scaling said residual vector uses a different scaling factor for each step for obtaining said basis vectors.

14. The computer system according to the claim 8, wherein said document matrix comprises a plurality of clusters with respect to said attributes and said clusters is at least categorized into a major cluster, a medium cluster and an outlier cluster.

15. A computer readable medium storing a computer program for retrieving, detecting, and identifying documents in a database, said documents in said database being constructed as a document matrix from attributes included in said documents, said program executing steps of;

creating said document matrix from said documents using at least one attribute;

creating a scaled residual matrix based on said document matrix from a predetermined function;

executing singular value decomposition to obtain a basis vector corresponding to the largest singular value;

re-constructing said residual matrix and scaling dynamically said re-constructed residual matrix to obtain another basis vector;

repeating said singular value decomposition step to said re-constructing step to create a predetermined set of basis vectors; and executing dimension reduction of said document matrix to perform detection, retrieval and identification of said documents in said database.

16. The computer readable medium according to the claim 15, wherein said scaled residual matrix is created according to the following equation:

$$R_s = [|r_1|^q r_1, \ldots, |r_M|^q r_M]^T$$

wherein $R_s$ is the scaled residual matrix, $r_i$ is a residual vector, i is a whole number mot more than a document munber M, $|r_i|$ is a norm of said residual vector, T represents the transpose operation performed on vectors, and q is a scaling factor dynamically determined according to said predetermined function.

17. The computer readable medium according to the claim 15, wherein said singular value decomposition is alternatively selected by a user between a latent semantic indexing method and a covariance matrix method.

18. The computer readable medium according to the claim 15, wherein said predetermined function is a function of the largest norm of said residual vector provided by the following equation:

$$q = func(t_{max}) \triangleq \begin{cases} \text{if } (t_{max} > 1) \text{ then } \dfrac{1}{t_{max}} \\ \text{if } (t_{max} \approx 1) \text{ then } P + t_{max}, \\ \text{if } (t_{max} < 1) \text{ then } \dfrac{1}{10^{2-t_{max}}} \end{cases}$$

wherein p is a whole number, $t_{max}$ is the largest norm of said residual vectors.

19. The computer readable medium according to the claim 15, wherein the program further executes a step for orthogonalizing said basis vector (with respect to the other, heretofore computed basis vectors) prior to said step for re-constructing said residual matrix.

20. The computer readable medium according to the claim 15, wherein said dynamic scaling step uses a different scaling factor for each step for obtaining said basis vectors.

21. The method according to the claim 15, wherein said document matrix comprises a plurality of clusters with respect to said attributes and said clusters is at least categorized into a major cluster, a medium cluster and an outlier cluster.

22. A server for retrieving, detecting, and identifying documents in a database, said documents in said database being constructed as a document matrix from attributes included in said documents, said server communicating to a client through a network, said server comprising;

means for receiving a request for retrieving and detecting said document though said network;

means for receiving another request for selecting a method for singular value decomposition from said client;

means for creating said document matrix from said documents using at least one attribute;

means for scaling said residual matrix based on said document matrix from a predetermined function;

means for executing singular value decomposition to obtain a basis vector corresponding to the largest singular value in response to said another request;

means for re-constructing said residual matrix and scaling dynamically said re-constructed residual matrix to obtain another basis vector;

means for repeating said singular value decomposition step to said re-constructing step to create a predetermined set of basis vectors; and means for executing dimension reduction of said document matrix to perform detection, retrieval and identification of said documents in said database; and means for returning at least one result of said detection, said retrieval and said identification to said client.

23. The server according to the claim 22, wherein said means for scaling said residual matrix uses a different scaling factor for each step for obtaining said basis vectors.

* * * * *